United States Patent
Veres

(10) Patent No.: US 7,270,194 B2
(45) Date of Patent: *Sep. 18, 2007

(54) DRILLING MACHINE WITH PNEUMATIC CONTROL

(75) Inventor: Richard Veres, Whittier, CA (US)

(73) Assignee: P.V. Tools, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/404,298

(22) Filed: Apr. 14, 2006

(65) Prior Publication Data

US 2006/0180326 A1    Aug. 17, 2006

Related U.S. Application Data

(63) Continuation of application No. 10/951,323, filed on Sep. 26, 2004, now Pat. No. 7,048,077.

(51) Int. Cl.
*E21B 3/00*    (2006.01)

(52) U.S. Cl. .......................... 173/216; 173/19; 173/47; 173/145; 408/9; 408/14; 408/17; 408/138

(58) Field of Classification Search ..................... 173/4, 173/19, 29, 47, 145; 408/9, 10, 12, 14, 17, 408/130, 137, 138, 141, 702
See application file for complete search history.

(56) References Cited

U.S. PATENT DOCUMENTS

| | | | |
|---|---|---|---|
| 2,869,403 A | 1/1959 | Bent | |
| 3,512,433 A | 5/1970 | Juhasz et al. | |
| 3,552,238 A | 1/1971 | Quackenbush | |
| 4,418,767 A | 12/1983 | Vindez | |
| 4,440,529 A * | 4/1984 | Henslee et al. | 408/1 R |
| 4,538,942 A | 9/1985 | Vindez | |
| 4,561,530 A | 12/1985 | Parsons et al. | |
| 4,612,998 A | 9/1986 | Vindez | |
| 4,668,134 A | 5/1987 | Vindez | |
| 4,702,650 A * | 10/1987 | Golwas et al. | 408/6 |
| 4,879,660 A * | 11/1989 | Asakura et al. | 700/173 |
| 5,022,798 A * | 6/1991 | Eckman | 408/1 R |
| 5,022,800 A | 6/1991 | Vindez | |
| 5,062,745 A * | 11/1991 | Eckman | 408/17 |
| 5,143,161 A | 9/1992 | Vindez | |
| 5,205,681 A | 4/1993 | Eckman | |
| 5,328,302 A * | 7/1994 | Eckman | 408/17 |
| 6,196,772 B1* | 3/2001 | Thames et al. | 408/1 R |
| 2003/0072627 A1* | 4/2003 | Bureller et al. | 408/14 |

* cited by examiner

*Primary Examiner*—Thanh Truong
(74) *Attorney, Agent, or Firm*—Fulwider Patton LLP

(57) ABSTRACT

A pneumatic drilling machine is provided, comprising a pneumatic motor, a circuit for connecting the motor to a source of compressed air, a tool holder spindle, and a drive mechanism. The drive mechanism comprises a coupling shaft which can be moved to select a first mode of driving the spindle and a second method of driving the spindle. The mechanism has a driving cycle which comprises a stationary mode at the beginning and end of the cycle, and at least one phase for driving the spindle according to the first driving method, then a phase for driving the spindle according to the second driving method, then the stopping of the supply of air to the motor. A supply valve of the circuit is controlled pneumatically by the drive mechanism to interrupt the supply of compressed air to the motor at the end of the driving cycle.

10 Claims, 5 Drawing Sheets

DRILLING MACHINE WITH PNEUMATIC CONTROL

CROSS-REFERENCE TO RELATED APPLICATIONS

This application is a continuation of U.S. Ser. No. 10/951,323, filed on Sep. 26, 2004, now U.S. Pat. No. 7,048,077.

FIELD OF THE INVENTION

The present invention relates to the field of pneumatic drilling machines, more specifically, pneumatic drilling machines which automatically terminate the supply of compressed air to the machine after a drilling cycle is complete.

BACKGROUND OF THE INVENTION

Positive feed pneumatic power drilling machines are widely used in many industries. Such drilling machines normally have a single motor for turning a spindle through a drive gear train. The spindle is threaded into a feed gear that turns at a predetermined rate faster than the turning rate of the spindle for advancing the spindle as the drill progresses through a work piece. The feed gear is driven by a gear train from the same motor as the drive gear train. The gear ratio of the drive gear train is selected to be slightly less than the gear ratio of the feed gear train so the feed gear will turn slightly faster than the drive gear. In that way, the spindle is advanced a predetermined amount for each turn. Once the spindle has been advanced sufficiently, a mechanism is actuated to disengage the spindle feed gear train from the motor and lock it in place. As the motor continues to drive the spindle in the same direction, the spindle threads turn inside the locked feed gear to rapidly retract the spindle.

Prior art mechanisms for disengaging the gear trains from the motor have included mechanical switches for interrupting the supply of compressed air to the motor. The inclusion of mechanical switches in a pneumatic drilling machine have certain disadvantages. First, they are difficult to assemble, requiring delicate placement of the moving parts within the switch. Further, the delicate parts of the switch are prone to wear and tear, and detract from the longevity of the drilling machine as a whole, which otherwise benefits from a reduction in the number of moving parts that pneumatic tools generally provide.

Another aspect of prior art drilling machines is that they include pneumatic counting devices, for counting the number of drive cycles carried out by the machine. This allows the owner to carry out the required maintenance on the machine at a proper interval. However, a feature of the prior art counters is that they typically have been configured to add one cycle to the total count each time the motor is switched on. This is disadvantageous because a drill user will often turn the drill off, and then on again, a number of times in the middle of the feed mode. Thus, a single feed cycle may be counted as a number of cycles. This has the undesirable effect of indicating that the drill has been used more often than it really has been, and leads to uneconomical servicing of the machine.

Thus, a need exists in the art for a pneumatic drill with a pneumatically operated switch for turning off the motor. A need also exists for a counting system that counts feed cycles of the drill only at the completion of a feed cycle. It is believed that the present invention addresses these and other needs.

SUMMARY OF THE INVENTION

According to a preferred embodiment of the invention a pneumatic drilling machine with an automatic control system is described.

In a preferred embodiment, the drilling machine comprises a pneumatic motor, a tool holder spindle, and a drive mechanism connecting the motor to the spindle. The drive mechanism is configured to drive the spindle through a driving cycle, the driving cycle commencing and ending with the spindle being stationary. The driving cycle also includes a feed mode and a retraction mode.

In a preferred embodiment, the drive mechanism will include a pneumatic circuit and a control valve positioned in the circuit. The control valve is movable between a first position to select the feed mode, and a second position to select the retraction mode.

A supply valve is provided, positioned in the pneumatic circuit for supplying compressed air to the motor. The supply valve is movable between a closed position in which compressed air to the motor is interrupted and an open position in which air to the motor is supplied. A coupling shaft is also provided for changing the driving mode of the driving mechanism. The coupling shaft is axially biased by a coupling spring into a coupling chamber positioned in the pneumatic circuit.

The drive mechanism is configured to send, at the end of the driving cycle, a pneumatic signal to the supply valve via the pneumatic circuit, and the supply valve is configured to close upon receiving the pneumatic signal. In a preferred embodiment, the pneumatic signal is a bolus of air expelled from the coupling chamber by the bias of the coupling spring.

Another aspect of the invention is that the pneumatic circuit includes a connector for receiving compressed air, and the control valve is configured in relation to the pneumatic circuit so that, when the control valve is in the first position the coupling chamber is not open to the connector via the pneumatic circuit, but is open to the shut-off chamber. Yet another aspect of the invention is that the control valve is configured in relation to the pneumatic circuit so that, when the control valve is in the second position the coupling chamber is open to the connector via the pneumatic circuit, but is not open to the shut-off chamber.

A still further aspect of the invention is that the supply valve includes a shut-off piston positioned within a shut-off chamber and the coupling shaft includes a coupling piston positioned within the coupling chamber. In a preferred embodiment, the diameter of the shut-off piston is at least twice as large as the diameter of the coupling piston. In this embodiment, the bolus of air expelled from the coupling chamber is directed by the pneumatic circuit to the shut-off chamber of the supply valve. The bolus of air raises the pressure in the shut-off chamber to close the supply valve, and hence interrupt the supply of air to the motor.

A further feature of the invention is that the drive mechanism further includes a cycle counter configured to add one count only at the commencement of a retraction mode of driving the spindle.

These and other advantages of the invention will become more apparent from the following detailed description thereof and the accompanying exemplary drawings.

DETAILED DESCRIPTION OF THE PREFERRED EMBODIMENTS

Figure 1:
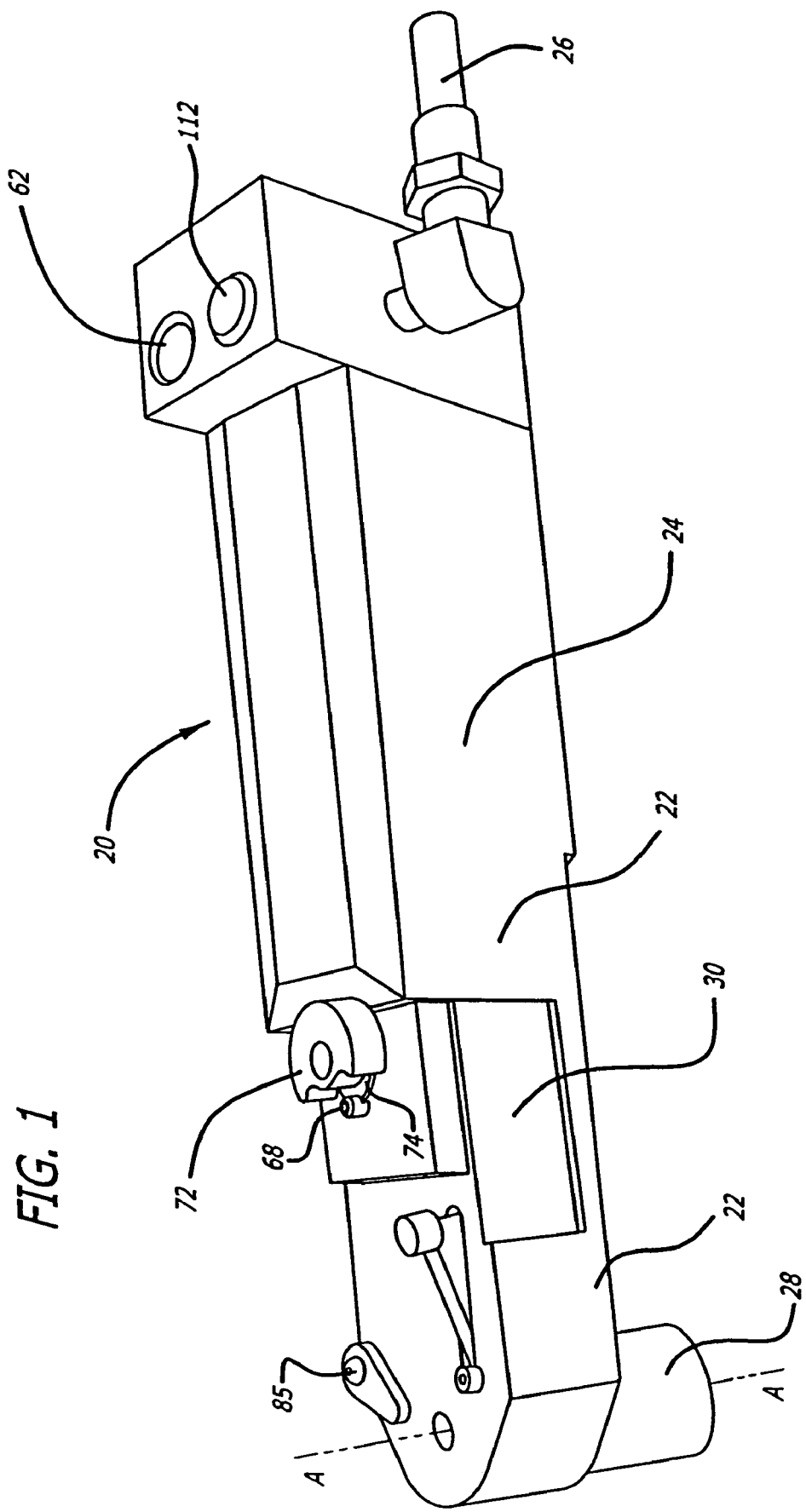
FIG. 1 represents a perspective view of a portable pneumatic drilling machine showing features of the invention.

With reference to FIG. 1, a pneumatic drilling machine, generally referred to by the numeral 20, and method according to a preferred embodiment of the present invention, is described. In general terms, the machine 20 illustrated in the figure is surrounded by a housing 22 and includes a conventional pneumatic motor 24. The motor is connectable to an external source of compressed air 25 (not shown in FIG. 1) through a connector 26. A tool holder spindle 28 held by the housing 22 is adapted to be rotatable about its axis A, and to move the tool back and forth along its axis A. A mechanism 30 for driving the spindle and for controlling the movement of the spindle 28 is located within the housing. Drilling tools can be mounted and removed from the spindle in a conventional manner.

The drive mechanism 30, which is schematically exemplified in FIGS. 2-5, includes a conventional mechanism known as a positive feed drill. An external source of compressed air 25 supplies compressed air to the drive mechanism 30 via the connector 26. Within the drilling machine housing, the compressed air is circulated, as described herein, through a series of ducts which collectively form a pneumatic circuit. FIGS. 2-5 exemplify additional features of the present invention, and, in the description below, the terms "lower," "upper," "horizontal," "left," and "right"0 relate to FIGS. 2-5.

In a preferred embodiment, the drive mechanism 30 includes a lower gear (or, drive gear) train 32 comprising gears 34, 36, 38, 40, and 42 intermeshing in series, and an upper gear (or, feed gear) train 44 comprising gears 46, 48, 50, and 52 intermeshing in series. The spindle 28 passes through the end gears 42 and 52 of each gear train. The lower and upper gear trains may be stationary, or rotate in various modes, as described herein.

In the idling mode, power is supplied via the motor 24 to lower gear 34, which imparts power only to the lower gear train 32. In this mode, the upper gear train 44 rotates only under frictional connection with the lower gear train 32, so that lower and upper gear trains rotate at the same speeds, causing the spindle to rotate under power, but not causing the spindle to advance or retract along its axis A.

In the feed, or advancing, mode, lower gear 34 is supplied with power from the motor 24 as before, but upper gear 46 is caused (as described herein below) to engage via conventional dog collar linkage to lower gear 36, thus placing both upper and lower gear trains under power. The number of teeth of upper and lower gear trains are selected to differ by preferably one or two teeth, causing the upper (feed) gear 52 to rotate about the spindle 28 at a slightly faster speed than lower (drive) gear 42. By conventional means, this difference in rotation speeds is harnessed to cause the spindle 28 to advance downwardly at a relatively slow speed through the upper end gear 52 and the lower end gear 42, while simultaneously rotating clockwise.

In the retraction mode, lower gear 34 is supplied with power from the motor as before, but upper coupling gear 46 is caused (as described herein below) to move upward to engage by conventional dog collar means a braking disc 54 which is fixed to the housing and unable to rotate. It will be appreciated that, under these conditions, the upper gear 44 train cannot rotate at all. It will be further appreciated that in this mode the lower gear train 32 will rotate faster than the upper gear train by a relatively large difference. By conventional means, this large difference in rotation speeds is harnessed to cause the spindle 28 to retract at a relatively rapid rate through the upper end feed gear 52 and the lower end drive gear 42, while simultaneously rotating clockwise.

Figure 2:
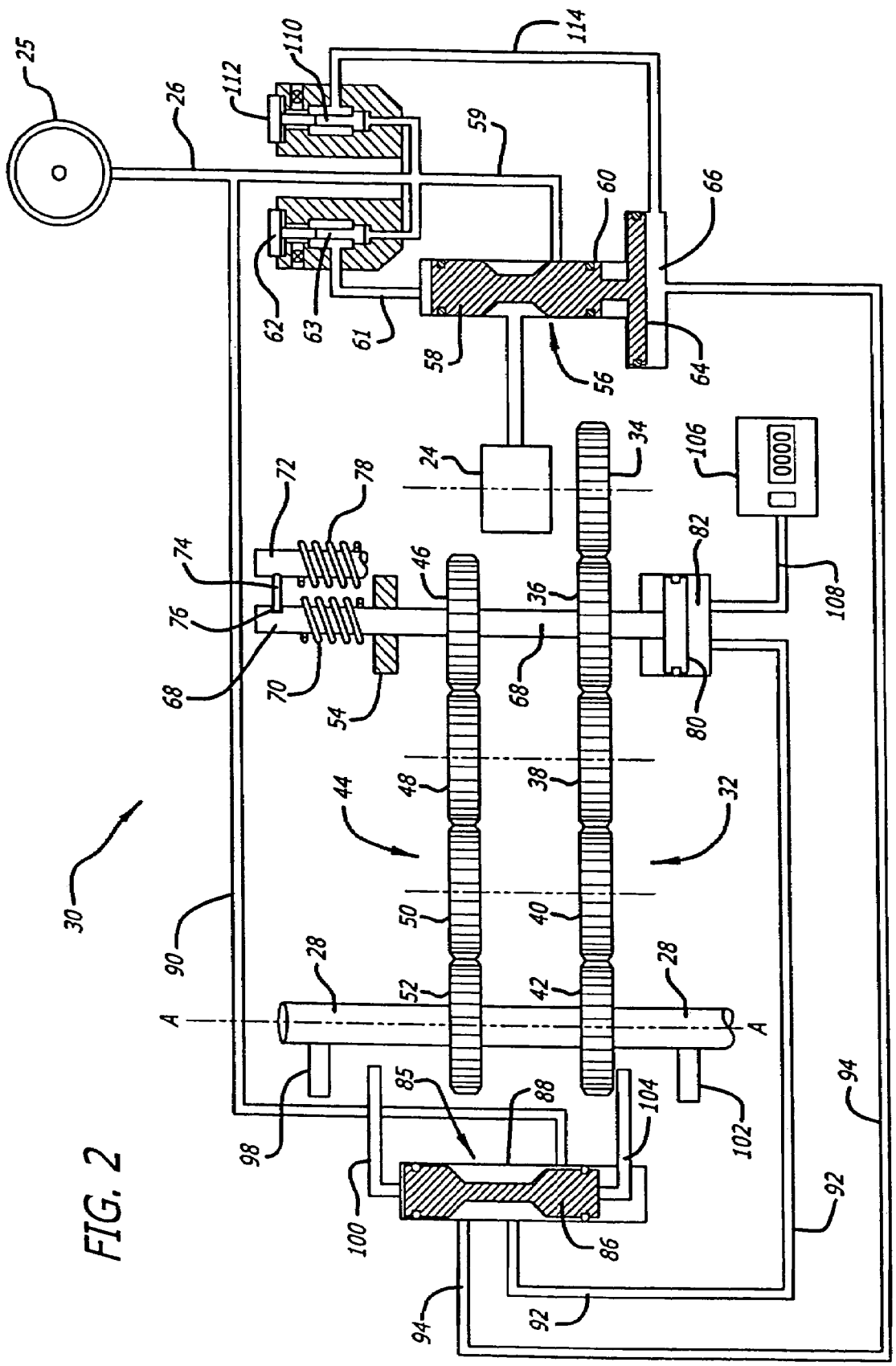
FIG. 2 is a schematic view showing aspects of a driving mechanism which controls the power supply and automatic shutoff of compressed air supply to the drilling machine of FIG. 1, schematically showing aspects of the drive mechanism in standby mode.

A further aspect of the drive mechanism 30 is the supply valve 56 positioned between the external compressed air supply 25 and the motor 24. The supply valve 56 includes a shaped slide 58 movable within a cylinder 60. The top of the cylinder 60 may be connected by air duct 61 to a micro valve 63 that presents an exposed surface or button 62 for manually activating the micro valve 63 which, in turn, activates the supply valve 56. The slide 58 is configured so that, upon downward displacement (FIGS. 3-5), it will permit the passage of compressed air from the source 25 via duct 59 through the valve 56 to the motor 24. At the lower end of the supply valve 56 is a shut-off piston 64 connected to the slide 58. The shutoff piston 64 resides within a shut-off chamber 66. A sufficient pressure in the shut-off chamber 66 is capable of lifting the shut-off piston 64 and slide 58 upwards to interrupt the supply of compressed air to the motor 24. (FIG. 2)

Yet another aspect of the drive mechanism 30 is the coupling shaft 68 which is configured to rotate in, and slide through, lower coupling gear 36 and to rotate in, but to be translationally connected with, upper coupling gear 46. Thus, any translational movement of the coupling shaft 68 will translationally carry upper gear 46 with it. A coupling spring 70 is positioned to bias the coupling shaft 68 downward. Adjacent the coupling shaft is an idler lock 72, having an arm 74 configured to removably engage with an indent 76 in the coupling shaft 68. A torsion spring 78 torsionally biases the idler lock 72. Fixed above the upper gear 46 is the braking disc 54 fixed to the housing and unable to rotate, so that an upward movement of the coupling shaft 68 engages upper gear 46 with the braking disc 54, a downward movement of the coupling shaft engages gear 46 with gear 36. In an intermediate position, the coupling shaft 68 is free from connection with either the brake disc 54 or the lower gear 34. Connected to the lower end of the coupling shaft 68 is a coupling piston 80 residing within a coupling chamber 82. A sufficient pressure in the coupling chamber 82 is capable of lifting the coupling piston 80 and coupling shaft 68 against the bias of the spring 70.

Another aspect of the drive mechanism 30 is the control valve 85 that includes a shaped stem 86 sliding within a cylinder 88. A supply of compressed air is brought directly from the compressed air source 25 to the control valve 85 by a duct 90. The control cylinder 88 is connected via a duct 92 with the coupling chamber 82, and via a duct 94 with the shut-off chamber 66. The control valve 85 is configured to have two modes, corresponding with two vertical positions of the shaped stem 86 within the cylinder 88. In a first mode, the stem 86 is in an upper position and configured to pneumatically connect the coupling chamber 82 with the shut-off chamber 66 via duct 92 and duct 94, but prevent the supply of compressed air 25 to both the shut-off chamber and the control chamber, as exemplified in FIG. 2. In a second mode, the stem 86 is in a lower position and permits compressed air to be fed from the compressed air source 25 to the coupling chamber 82, but interrupts the pneumatic connection between the coupling chamber 82 and the shut-off chamber 66, as exemplified in FIG. 5.

The vertical position of the stem 86 of the control valve 85 may be set by movement of the spindle 28, as follows. An upper spindle nut 98 is attached to the spindle 28 so that downward movement of the spindle brings the upper spindle nut 98 in contact with an upper valve arm 100 to move the stem 86 downwards. A lower spindle nut 102 is attached to the spindle 28 so that upward movement of the spindle brings the lower spindle nut in contact with a lower valve arm 104 to move the stem upwards.

A further aspect of the drive mechanism is that it includes a pneumatic counting device 106, pneumatically connected with coupling chamber 82 via duct 108. The counting device may be a commercially available counting device such as Part No. PM1421 by Ellis/Kuhnke Controls, of Atlantic Highlands, N.J. 07716. The counting device is adapted to count the number of drive cycles performed by the drilling machine so that service requirements on the machine may be performed as required. Each time compressed air is delivered to the coupling chamber 82 (as described herein below), the counting device will add one cycle to the total number of cycles counted.

In use, the drilling machine 20 may be operated as follows.

The drive mechanism is initially configured in a standby mode, as schematically represented in FIG. 2. In standby mode, the supply valve 56 is closed in a first position, thus interrupting supply of compressed air 25 to the motor 24. The coupling shaft is in an intermediate position, held in place by the arm 74 on the idler lock 72. The control valve 85 is in an upper first position with the slide 86 interrupting supply of compressed air to the coupling chamber 82.

Figure 3:
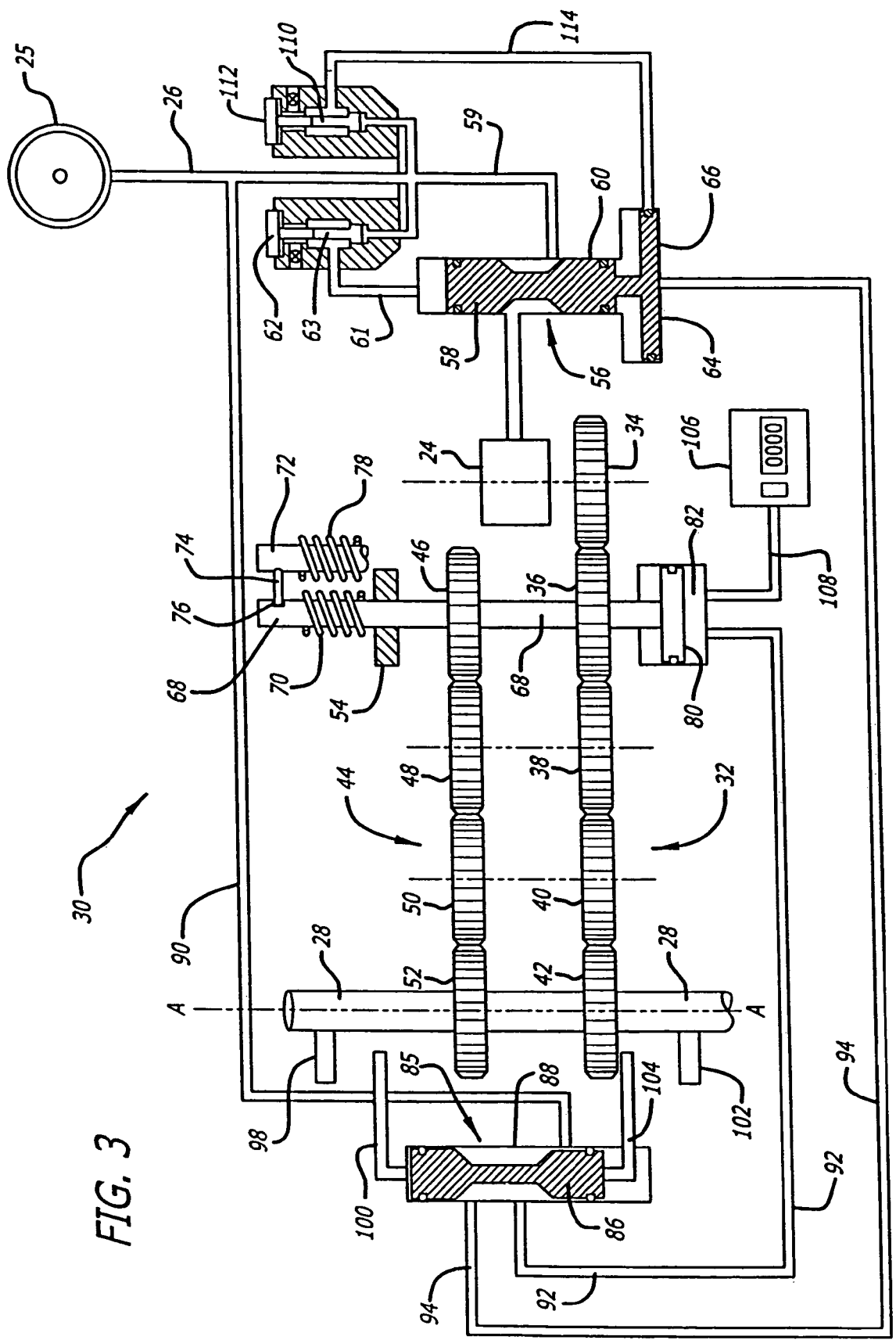
FIG. 3 is the schematic view of the preceding Figure, schematically showing aspects of the drive mechanism in idle mode.

The standby mode may be followed by the idle mode, as schematically represented in FIG. 3. The motor is activated by manually depressing the start button 62. The momentary opening of the micro valve 63 directs an air signal above the slide 58 of the supply valve 56 via the duct 61 displacing the slide to open the supply valve, and thus opening the compressed air supply going to the motor 24, to cause the motor to turn and supply power to lower gear 34, and hence to the entire lower gear train 32. At this stage the coupling shaft 68 is positioned in an intermediate position so that gear 46 is engaged with neither the brake disc 54 nor lower gear 36. In this position the drive mechanism 30 is in the idle mode, with the spindle 28 under rotational or driving power from the lower gear train 32, but not under translational or feeding power.

Figure 4:
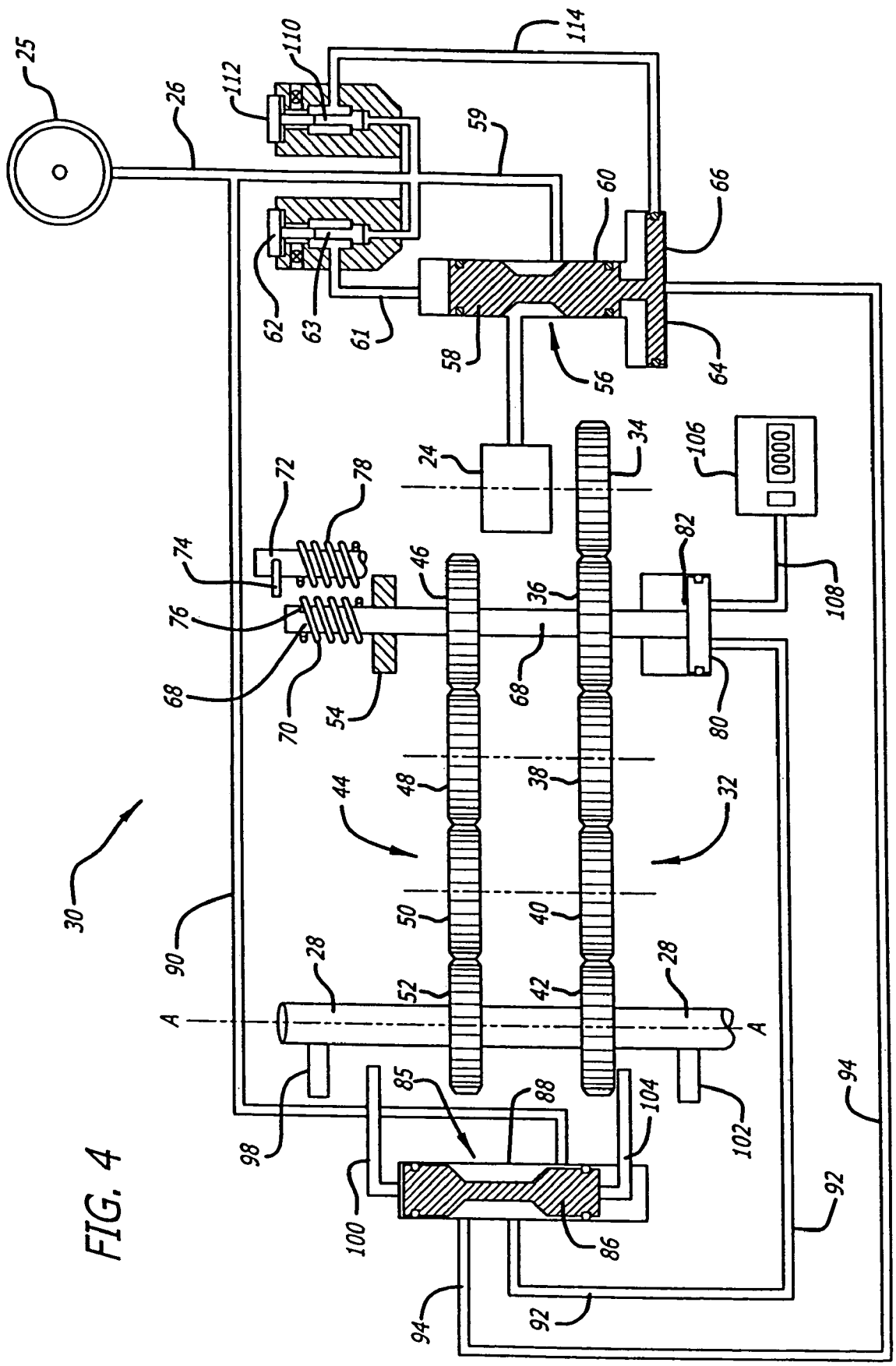
FIG. 4 is the schematic view of the preceding Figures, schematically showing aspects of the drive mechanism in feed mode.

The idle mode may be followed by the feed mode, as schematically represented in FIG. 4. In order to engage the upper gear train 44 to advance the spindle 28, the idler lock 72 may be turned sufficiently to allow the arm 74 to disengage from the indent 76 in the coupling shaft 68. This will allow the coupling shaft 68 under the biasing action of the spring 70 to move down and engage the upper coupling gear 46 with the lower coupling gear 36. The tool now enters the feed, or advancing, mode, with the spindle 28 rotating and being advanced slowly under power. The feed action of the spindle will continue until the upper spindle nut 98 reaches and pushes down on, the upper valve arm 100 to depress the stem 86 within the cylinder 88 of the control valve 85, as exemplified in FIG. 5, thus leading to the retraction mode, as detailed below.

Figure 5:
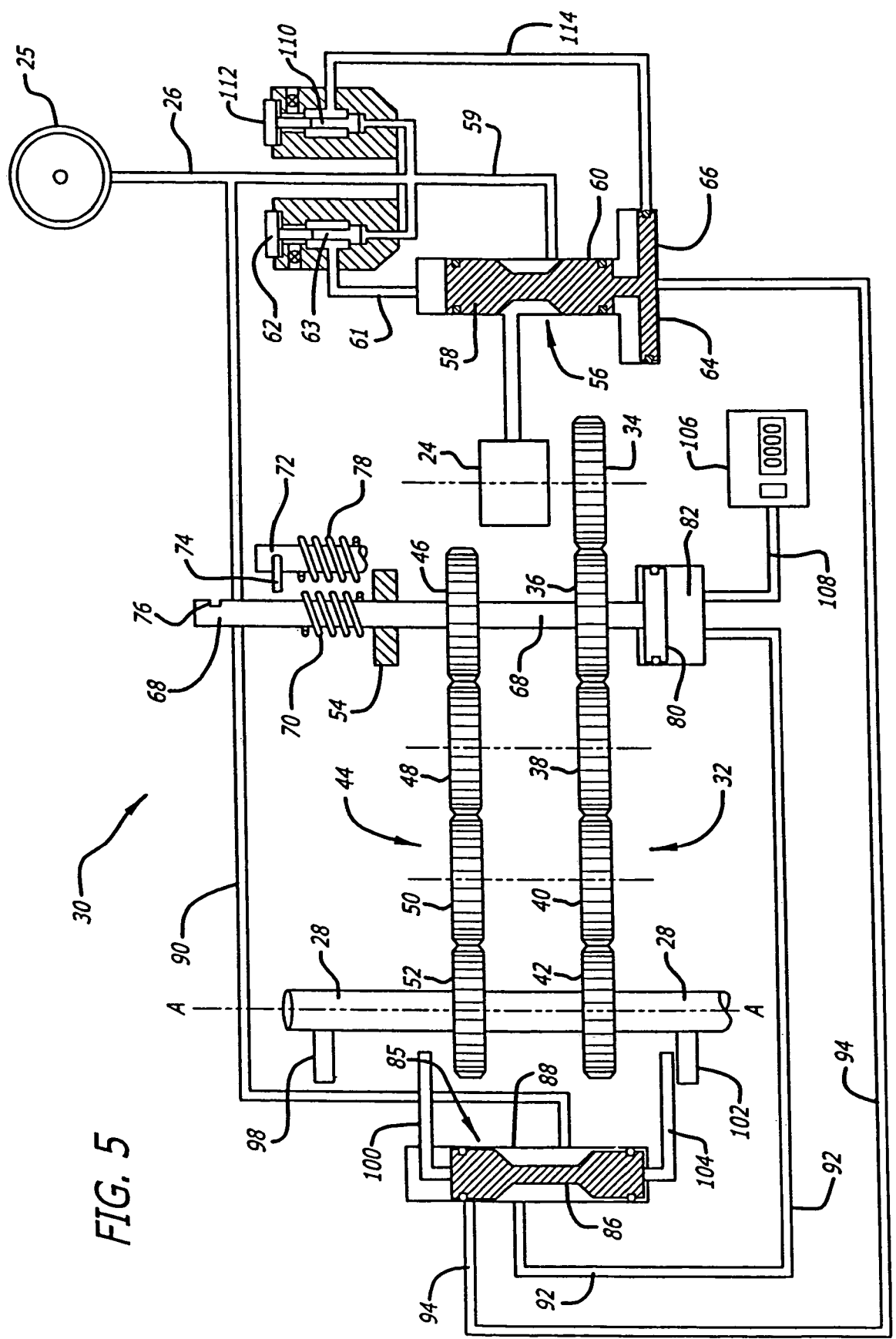
FIG. 5 is the schematic view of the preceding Figures, schematically showing aspects of the drive mechanism in retraction mode.

The feed mode may be followed by the retraction mode, as schematically represented in FIG. 5. The downward movement of the control valve stem 86 allows compressed air to flow into the coupling chamber 82, forcing up the coupling piston 80 and hence the coupling shaft 68, thereby ending the spindle feed process by disengaging the upper coupling gear 46 from lower coupling gear 36, and locking the upper gear 46 against the brake disc 54 of the upper housing. The immobilization of the upper gear train 44 will initiate the retraction phase (or return cycle) characterized by a fast return of the spindle (about 1 mm per revolution), until the lower spindle nut 102 reaches and elevates the lower valve arm 104, returning the valve stem 86 to its first upper position, as exemplified in FIG. 2, thereby to end the retraction mode, as set forth below.

The return of the valve stem 86 to its first position firstly disconnects the compressed air supply 25 from the coupling chamber 82 (FIG. 2), and, almost simultaneously, connects duct 94 with duct 92, thus pneumatically connecting the coupling chamber 82 with the shut-off chamber 66. It will be appreciated that when the stem 86 was in its second lower position, the pressure in duct 94 was around atmospheric pressure, but the pressure in the coupling chamber 82 was under compression from the source 25, which may be in the region of 90 p.s.i. Thus, when the upward movement of the stem 86 disconnects the coupling chamber 82 from the compressed air supply 25, but connects the coupling chamber 82 to the shut-off chamber 66, the compressed air present in the coupling chamber 82 is at an elevated pressure (i.e. well above atmospheric pressure) and will rapidly discharge into the shut-off chamber 66 until the pressure in both chambers 82 and 66 and their related ducts is equalized. Furthermore, at the same time, the coupling spring 70 biases the coupling piston 80 downwards, adding to the escape of air from the coupling chamber 82 into the shut-off chamber 66 by expressing an additional volume, or "bolus," of air (about 0.1 cu. inches) from the coupling chamber 82. It will be appreciated that the resulting upward force applied to the shut-off piston 64 will lift the supply valve slide 58 to its upper first position (FIG. 2) to cut connection of the main air supply 25 to the motor 24, thus shutting off the motor 24. The drive mechanism is now in standby phase, the same condition it was in prior to pressing button 62. To start the whole cycle over, the user may press button 62 once again.

It will be appreciated that the manner in which the supply valve 56 is closed, as described in the preferred embodiment, may be accomplished by transmitting a pneumatic signal directly to the supply valve via the pneumatic circuit within the housing, specifically by the ducts 92, 94. Thus, in a preferred embodiment, the force applied upon the valve 56 to move it to a closed position is a positive pneumatic force, i.e., a force not applied by a mechanical action upon the supply valve itself. Moreover, in another aspect, the source of the pneumatic signal may derive from a fixed quantity of air trapped at elevated pressure within a reservoir located in the drive mechanism. In a preferred embodiment, the reservoir may include the coupling chamber 82, its supply duct 92, and also may include a volume defined by the cycle counting device 106 and its supply duct 108 if present. The fixed quantity of air trapped at elevated pressure within a reservoir located in the drive mechanism may be distinguished over an effectively limitless supply of compressed air from the main source of compressed air 25 which is not trapped in the drive mechanism.

A significant aspect of a preferred embodiment of the invention is that the ending position of the slide 86 of the control valve 85 at the end of a drilling cycle is the same as its starting position prior to activation of the drilling cycle, and that, at both the start and the end of a drilling cycle (as seen in FIG. 2), the main compressed air supply 25 to the motor 24 is closed by the supply valve 56 and the compressed air supply to the coupling chamber 82 is closed by the control valve 85, thus giving rise to a completed cycle of operation in all respects. If, for example, the slide 86 connected the compressed air supply 25 with shut-off chamber 66 upon the upward movement of the slide 86 at the end of a drilling cycle, the compressed air has raised the slide 58 to turn off the motor 24. However, it will be appreciated that compressed air would now be supplied to the shut-off chamber 66 at the start of a new drilling cycle, a condition which may prevent the slide 58 from being downwardly activated, with disruptive consequences.

An additional aspect of the drilling machine is the emergency valve 110 with its activation button 112. The valve 110 is also a micro valve, configured to direct compressed air from the source 25 direct to the shut-off chamber 66 of the supply valve 56 via a duct 114. As will be appreciated, the compressed air in the shut-off chamber 66 will force the slide 58 of the supply valve upwards to interrupt air supply to the motor 24. In case of an emergency, depressing the activation button 112 will activate the micro valve 110 which in turn will shut off the supply valve 56 and the motor 24. A bleed hole in the shutoff chamber 66 allows for the decompression of the chamber 66, thus allowing the supply valve 56 to be turned on again.

A further significant feature of a preferred embodiment of the invention is that the cycle counter 106 is pneumatically connected to the coupling chamber 82. This has the advantage that a driving cycle is only counted once the spindle has completed a feed phase, marked by the advance of the control valve 85 to its second position, upon the drive mechanism entering the retraction phase. Accordingly, if the emergency shutoff valve 110 is activated by pressing emergency button 112 in the middle of a feeding phase, an additional cycle will not necessarily be added to the counter when the motor is turned on again. Only upon the commencement of a retraction phase will the counter add one cycle to the total. It will be appreciated that this feature has an advantage over systems that add one cycle to the total every time the motor is switched on. In such machines, interrupted but recommenced drive cycles count as a full cycle upon each recommencement, thus biasing the total count to a higher level than actually carried out by the drilling machine, and leading to uneconomical servicing of the machine or replacing its accessories such as drill bits.

Thus, the preferred embodiments of the invention provide for an inexpensive and reliable device and method for automatically controlling a drilling machine. The use of a pneumatic control over the supply valve 56, which controls the supply of compressed air to the drive mechanism, eliminates the dangers present in the use of mechanical parts which tend to wear down during the lifetime of a drilling machine. Moreover, a pneumatic control system is typically easier to assemble than a mechanical control system, and eliminates much of the labor intensive operation of assembling the small mechanical pieces of a mechanical control system.

While a particular form of the invention has been illustrated and described, it will also be apparent to those skilled in the art that various modifications can be made without departing from the spirit and scope of the invention. Accordingly, it is not intended that the invention be limited except by the appended claims.

I claim:

1. A pneumatic drilling machine with an automatic control system, comprising:
    a pneumatic motor;
    a tool holder spindle;
    a drive mechanism connecting the motor to the spindle, the drive mechanism being configured to drive the spindle through a driving cycle, the driving cycle commencing and ending with the spindle being stationary, the driving cycle including a feed mode of driving the spindle and a retraction mode of driving the spindle, the drive mechanism including:
        a pneumatic circuit;
        a control valve positioned in the pneumatic circuit, the control valve being movable between a first position to select the feed mode of driving the spindle and a second position to select the retraction mode of driving the spindle; and
        a supply valve positioned in the pneumatic circuit for supplying compressed air to the motor, the supply valve being movable between a closed position in which compressed air to the motor is interrupted and an open position in which air to the motor is supplied, the supply valve comprising a shaped slide movable within a cylinder and a shut off piston connected to the slide;
    wherein the drive mechanism is configured to send, upon conclusion of the retraction mode of driving the spindle, a pneumatic signal to the supply valve via the pneumatic circuit, the supply valve being configured to move from the open position to the closed position upon receiving the pneumatic signal; and
    wherein the drive mechanism includes a coupling shaft for changing the mode of driving the driving mechanism, the coupling shaft being axially biased by a coupling spring into a coupling chamber, the coupling chamber being positioned in the pneumatic circuit, and wherein the pneumatic circuit includes a connector for receiving compressed air, the control valve being configured in relation to the pneumatic circuit so that, when the control valve is in the first position the coupling chamber is not open to the connector, but is open to the supply valve, via the pneumatic circuit.

2. The drilling machine of claim 1, wherein the pneumatic signal to the supply valve via the pneumatic circuit is a pneumatic signal sent directly to the supply valve to apply pneumatic pressure to the shut off piston.

3. The drilling machine of claim 1, the control valve being further configured in relation to the pneumatic circuit so that, when the control valve is in the second position the coupling chamber is open to the connector, but is not open to the supply valve, via the pneumatic circuit.

4. The drilling machine of claim 1, wherein the drive mechanism further includes a cycle counter directly connected via the pneumatic circuit to the coupling chamber.

5. The drilling machine of claim 1, wherein the drive mechanism further includes a cycle counter configured to add one count only upon commencement of the retraction mode of driving the spindle.

6. The drilling machine of claim 1, the drive mechanism having a first condition at the commencement of the driving cycle wherein the control valve is in the first position and the supply valve is closed, and a second condition at the end of the driving cycle, the first condition being the same as the second condition.

7. The drilling machine of claim 1, wherein the drive mechanism is configured to set the control valve in the first position by a retraction movement of the spindle, and to set the control valve in the second position by an advancing movement of the spindle.

8. The drilling machine of claim 1, wherein the drive mechanism further includes a manually operable valve configured in relation to the pneumatic circuit so that activation of the manually operable valve pneumatically moves the supply valve from the open position to the closed position.

9. A pneumatic drilling machine with an automatic control system, comprising:
   a pneumatic motor;
   a tool holder spindle;
   a drive mechanism connecting the motor to the spindle, the drive mechanism being configured to drive the spindle through a driving cycle, the driving cycle commencing and ending with the spindle being stationary, the driving cycle including a feed mode of driving the spindle and a retraction mode of driving the spindle, the drive mechanism including:
      a pneumatic circuit;
      a control valve positioned in the pneumatic circuit, the control valve being movable between a first position to select the feed mode of driving the spindle and a second position to select the retraction mode of driving the spindle; and
      a supply valve positioned in the pneumatic circuit for supplying compressed air to the motor, the supply valve being movable between a closed position in which compressed air to the motor is interrupted and an open position in which air to the motor is supplied;
   wherein the drive mechanism is configured to send, upon conclusion of the retraction mode of driving the spindle, a pneumatic signal to the supply valve via the pneumatic circuit, the supply valve being configured to move from the open position to the closed position upon receiving the pneumatic signal; and
   wherein the drive mechanism further includes a coupling shaft for changing the mode of driving the driving mechanism, the coupling shaft being axially biased by a coupling spring into a coupling chamber, the coupling chamber being positioned in the pneumatic circuit, and wherein the pneumatic circuit includes a connector for receiving compressed air, the control valve being configured in relation to the pneumatic circuit so that, when the control valve is in the first position the coupling chamber is not open to the connector, but is open to the supply valve, via the pneumatic circuit.

10. A pneumatic drilling machine with an automatic control system, comprising:
   a pneumatic motor;
   a tool holder spindle;
   a drive mechanism connecting the motor to the spindle, the drive mechanism being configured to drive the spindle through a driving cycle, the driving cycle commencing and ending with the spindle being stationary, the driving cycle including a feed mode of driving the spindle and a retraction mode of driving the spindle, the drive mechanism including:
      a pneumatic circuit;
      a control valve positioned in the pneumatic circuit, the control valve being movable between a first position to select the feed mode of driving the spindle and a second position to select the retraction mode of driving the spindle; and
      a supply valve positioned in the pneumatic circuit for supplying compressed air to the motor, the supply valve being movable between a closed position in which compressed air to the motor is interrupted and an open position in which air to the motor is supplied;
   wherein the drive mechanism is configured to send, upon conclusion of the retraction mode of driving the spindle, a pneumatic signal to the supply valve via the pneumatic circuit, the supply valve being configured to move from the open position to the closed position upon receiving the pneumatic signal;
   and wherein the drive mechanism further includes a coupling shaft for changing the mode of driving the driving mechanism, the coupling shaft being axially biased by a coupling spring into a coupling chamber, the coupling chamber being positioned in the pneumatic circuit, and wherein the pneumatic circuit includes a connector for receiving compressed air, the control valve being configured in relation to the pneumatic circuit so that, when the control valve is in the second position the coupling chamber is open to the connector, but is not open to the supply valve, via the pneumatic circuit.

* * * * *